April 12, 1966 T. N. JAMES ETAL 3,245,221
BRAKE PROPORTIONING VALVE
Filed Sept. 18, 1964 3 Sheets-Sheet 1

INVENTORS
TREVOR N. JAMES
JAMES A. PAYNE
BY
John B. Sowell
ATTORNEY

April 12, 1966  T. N. JAMES ETAL  3,245,221
BRAKE PROPORTIONING VALVE
Filed Sept. 18, 1964  3 Sheets-Sheet 2

INVENTORS
TREVOR N. JAMES
JAMES A. PAYNE
BY John B. Sowell
ATTORNEY

United States Patent Office 3,245,221
Patented Apr. 12, 1966

3,245,221
BRAKE PROPORTIONING VALVE
Trevor N. James, St. Clair Shores, and James A. Payne, Warren, Mich., assignors to The Budd Company, Philadelphia, Pa., a corporation of Pennsylvania
Filed Sept. 18, 1964, Ser. No. 397,567
4 Claims. (Cl. 60—54.5)

The present invention relates to compensating valves for hydraulic brake systems and more particularly to a proportioning valve device for obtaining maximum braking torque distribution between the front and rear wheel brakes of a vehicle.

It is well known that a vehicle seldom has uniform static load distribution between the front and rear wheels; it is also known that during rapid deceleration due to braking, dynamic loading shifts a portion of the normal load forces to the front wheels. The amount of braking torque which is required to slide any one of the load bearing wheels is directly proportional to the normal (toward the road surface) load force exerted on the wheel.

Under usual braking conditions there is a greater normal force on the front wheels than on the rear wheels and if the braking system has not been compensated, the maximum deceleration without sliding a wheel is limited by the normal forces on the rear wheels. It is common manufacturing practice to avoid the tendency of rear wheel skidding by creating greater braking torque at the front wheel brakes, thus compensating for the maldistribution of normal forces. As a consequence of such arbitrary compensation, there is a tendency of the front wheels to skid on slippery surfaces. This condition is especially hazardous at low speeds and low deceleration where there is no appreciable dynamic load shifting effect even though front wheel skidding is considered to be a lesser evil than rear wheel skidding. Arbitrary methods of compensation are not capable of obtaining maximum deceleration or ideal braking over the entire braking range for the torque distribution favors either the front or rear wheels.

Heretofore, complex deceleration-sensitive devices have been employed in an attempt to distribute braking effect between the front and rear wheels proportional to the deceleration so as to obtain a better distribution of braking torque. Some devices are designed to operate on an antiskid principle. Other devices are designed to operate on a deceleration-gravity-sensing principle. These latter devices usually require power boosters and/or separate actuators which are affected by grade level and changes in the viscosity of the hydraulic fluid and/or minor contamination in the fluid.

Therefore, it is a general object of the present invention to provide a simple, reliable and inexpensive proportioning valve for adjusting the hydraulic pressure from the master cylinder to the rear wheels at relatively high rates of deceleration.

It is a more specific object of the present invention to provide a new and improved proportioning valve structure having a new and improved mode of operation.

It is a further object of the present invention to provide a pressure actuated proportioning valve having a novel valve and piston structure.

It is another object of the present invention to provide a proportioning valve that becomes operable at a predetermined elevated pressure level indicative of high rates of deceleration.

It is another object of the present invention to provide pressure valve means of simple, structural design adapted to approximate an ideal (experimental) input-output pressure reduction ratio in a braking system.

In general, there is provided a valve body having a cylindrical outlet bore of greater diameter than its cylindrical inlet bore; a piston body, having a large outlet end piston and a small inlet end piston slidably fitted in the respective bores, is spring-urged, as by Belleville spring washers, toward the outlet end; an aperture through the piston body interconnects the inlet and outlet chambers formed behind the pistons in the bores of the valve body; a valve body, having a valve face, is floatingly mounted opposite a valve seat on the inlet end of said piston body so that hydraulic fluid pressure in the valve body initially forces the piston body and valve seat toward the valve face of the valve body, the valve body being suitably held against rearward movement, thereby closing the valve seat against the valve face and causing the pistons to be isolated in their respective chambers to act as a pressure reducing piston unit in the bores of the valve body which provides a pressure reduction between the fluid in the inlet and the fluid in the outlet passages of the valve body.

Further objects and advantages will be apparent from the drawings and the following description in which.

Figures 3, 4:
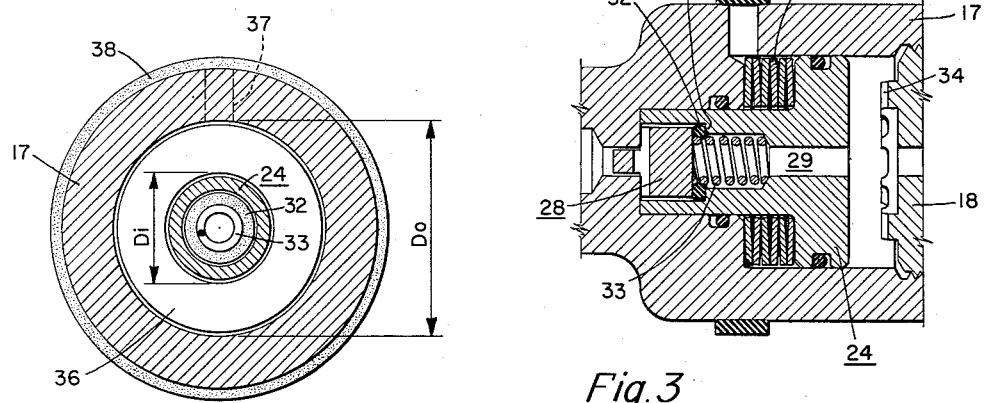
FIG. 3 is a partial section of the proportioning valve of FIG. 2 showing the position of the springs and pistons in the closed or proportioning position.
FIG. 4 is a section taken at lines 4—4 of FIG. 2.

In the preferred embodiment system, a master cylinder 10 is adapted to create hydraulic pressure at outlet Tee 11 when the brake pedal 12 is depressed. Hydraulic fluid is conducted to the wheel cylinders of the drum-type brakes 13 at the rear wheels of the vehicle through the novel proportioning valve 14 shown in FIGS. 2 to 4. Hydraulic fluid is normally conducted to the wheel cylinders of the disk-type brakes 15 through a hold-off or pressure reducing valve 16 shown in FIG. 7. Valve 16 is a device which effectively reduces the hydraulic fluid pressure from the master cylinder 10 approximately 110 p.s.i. as it passes to the wheel cylinders of the disk-type brakes 15. In the preferred embodiment system, proportioning valve 14 does not alter the pressure of the fluid from the master cylinder 10 until a pressure of approximately 400 p.s.i. is reached, and thereafter operates as a proportioning valve to reduce the additional increase of pressure by a ratio of approximately 3 to 1.

Valve 14 comprises a hollow cylindrical valve body 17, an end cap 18 screwed tight upon metal washer seal 19. An inlet passage 20 in valve body 17 is connected to the inlet bore 21. An outlet passage 22 in the end cap 18 is connected to the outlet bore 23. A piston body 24 has an inlet end piston 25 fitted in the inlet bore 21 of the valve body 17 and has an outlet end piston 26 fitted in the outlet bore 23 of the valve body 17. The ends of the piston body 24 are slidably mounted in the respective bores and provided with seals 27 which form a hydraulic seal therewith. A valve body 28, which may be referred to as a secondary piston, is slidably mounted in the inlet bore 21 opposite an aperture 29 through the piston body 24. The piston body may also be referred to as a whole, with the pistons 24 and 25 at the ends, as a "primary piston," the valve body 28 having enough fluid pressure surface when closed to be referred to as the "secondary piston." In the preferred embodiment a recess 30 is provided in the end of the primary piston which serves as a guide for the secondary piston 28. At the bottom of the recess 30 a valve seat 31 is provided which cooperates with the resilient valve washer 32 mounted on the secondary piston 28. Spring 33 positions secondary piston 28 in the inlet bore 21 and Belleville spring washers position primary piston 24 against stops 34 in the outlet bore 23. Hydraulic fluid is allowed to pass around secondary piston 28 to the outlet passage 22 via bleed grooves 35. The portion of the outlet bore 23 containing the Belleville spring washers 36 is connected to the atmosphere via port 37 covered by dust cover 38.

Figure 2:
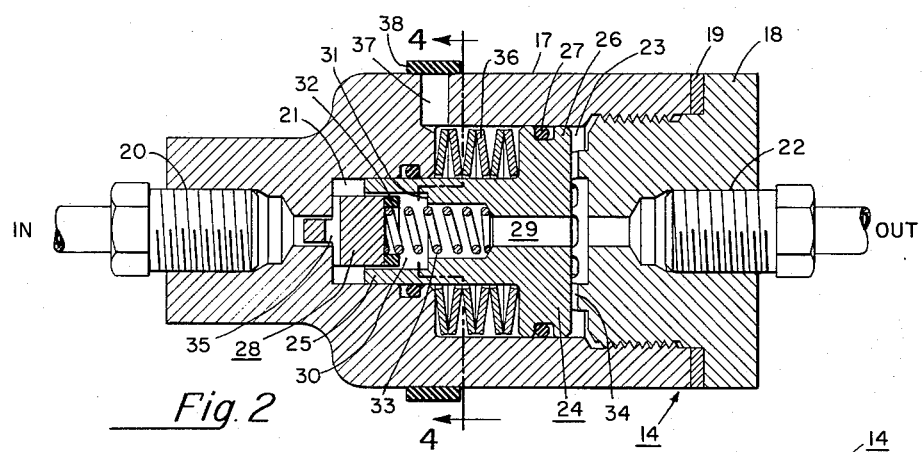
FIG. 2 is an enlarged section of a preferred embodiment proportioning valve showing the normal position of the springs and pistons.

FIG. 2 shows the springs and pistons in their normal position before braking action is created by an increase in hydraulic pressure as a result of depression of brake pedal 12. An increase in pressure causes hydraulic fluid to enter inlet passage 20 and to flow past the secondary piston 28 through the aperture 29 and out the outlet passage 22 to the wheel cylinders of the drum-type brakes 13. After the initial flow of the hydraulic fluid through the valve 14 there is a rapid build-up of hydraulic pressure in the brake system. This initial build-up in pressure may be considered equal at both the inlet and outlet passages causing a force to be exerted on the face of the outlet end 26 of the primary piston 24 equal to the area of the outlet bore 23 (minus the area of the aperture 29) multiplied by the pressure of the hydraulic fluid. The force exerted on the inlet end 25 of the primary piston 24 is equal to the area of the inlet bore 21 (minus the area of the aperture 29) multiplied by the same pressure. There is a resultant force which tends to compress the Belleville spring washers 36 and to move the primary piston 24 toward the inlet passage 20. When the hydraulic pressure reaches approximately 400 p.s.i. the force is sufficient to overcome the Belleville spring washers 36 allowing the valve seat 31 to contact the resilient valve washer 32 on the secondary piston and effectively close off aperture 29. It should be noted, that if the valve seat does not initially seal off the aperture, there is an increase in pressure and further movement of the piston body against the valve body will seal off the aperture, thus the novel valve will operate in an adverse environment. After aperture 29 is closed off, any additional increase in hydraulic pressure tends to move both the primary piston 24 and the secondary piston 28 as a unit toward the outlet passage 22, thus, the two pistons now operate as a single unit to provide a pressure reducing piston 24, 28 in the bore of the valve body. For example, any further increase in the inlet pressure $\Delta Pi$ after reaching approximately 400 p.s.i. causes a further increase in the outlet pressure $\Delta Po$ which is equal to the ratio of the square of the diameter $Di$ of the primary piston inlet end divided by the square of the diameter $Do$ of the primary piston outlet end multiplied by $\Delta Pi$ or $$\Delta Po = \frac{(Di)^2}{(Do)^2} \Delta Pi$$

The hydraulic pressure at which the valve seat 31 closes to form the pressure reducing piston 24, 28 may be determined by the force required to compress the Belleville spring washers 36. The force on the Belleville washers is affected by the diameter of the ends of the primary piston and the aperture therein.

Figure 5:
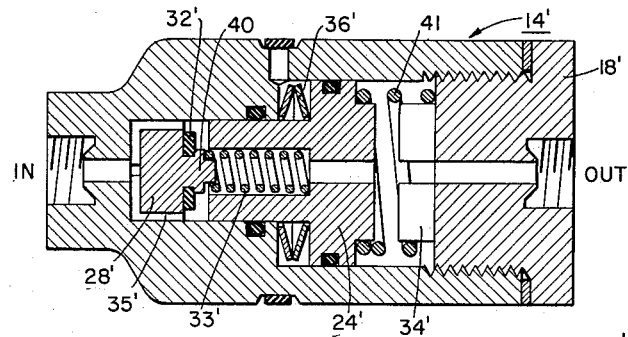
FIG. 5 is an enlarged section of a modified embodiment proportioning valve.

Belleville spring washers have been employed in the preferred embodiment because they may be designed to provide a substantial deflection without a substantial increase in load as they approach the flat shape; this feature assures that the valve seat 31 always seals tightly against resilient washer 32 at the desired load or pressure. The modified valve 14' shown in FIG. 5 operates in the same manner as already explained with regard to proportioning valve 14. Secondary piston 28' is provided with modified bleed grooves 35' and is further provided with a head portion 40 that serves as a keeper for resilient valve washer 32' as well as a guide for spring 33'. An additional return spring 41 is provided in the outlet bore 23' so as to position the primary piston 24' away from the end cap 18'. When the primary piston 24' is spaced apart from the end cap 18' fewer Belleville spring washers 36' are required because there is less likelihood that the primary piston 24' will bottom on the end cap during an increase in pressure effected by the movement of pressure reducing piston 24', 28'.

Figure 6:
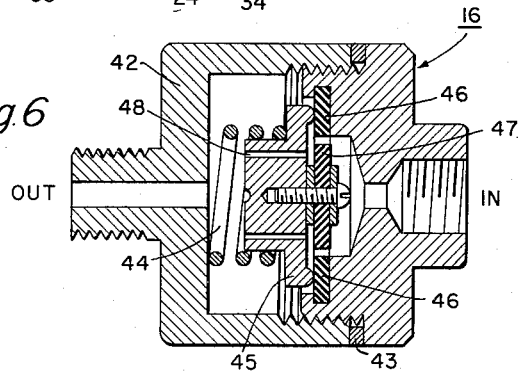
FIG. 6 is an enlarged section of the hold-off valve employed in the preferred embodiment system of FIG. 1.

Hold-off or pressure reducing valve 16 shown in FIG. 6 is effective to reduce the fluid pressure from the master cylinder 10 approximately 110 p.s.i. as it passes to the wheel cylinders of the disk-type brakes 15. Valve 16 comprises a valve body 42 having an end cap screwed tight upon metal washer seal 43. Spring 44 provides sufficient compression force so that a fluid pressure build-up of approximately 110 p.s.i. is necessary to lift valve plate 45 from the valve seat 46. Resilient washer 47, mounted on the face of valve plate 45, covers bleed grooves 48 and cooperates therewith to provide a check valve during pressure build-up and to provide return path.

Figure 1:
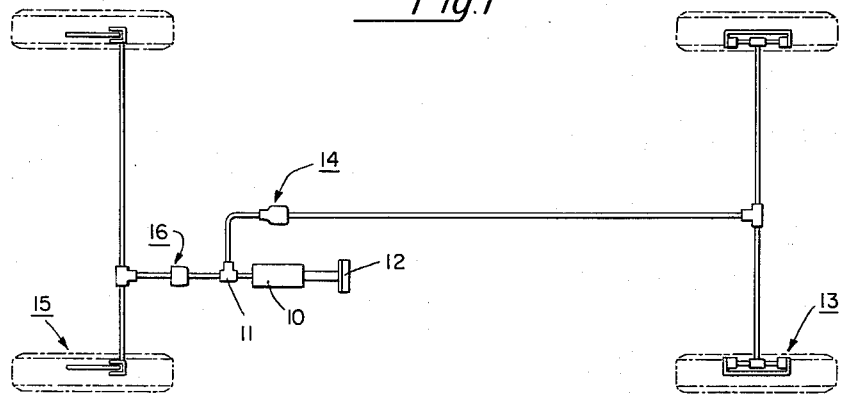
FIG. 1 is a schematic view showing the present invention proportioning valve in a preferred embodiment brake system having drum-type rear wheel brakes and disk-type front wheel brakes, both actuated by a single master cylinder.
Figure 7:
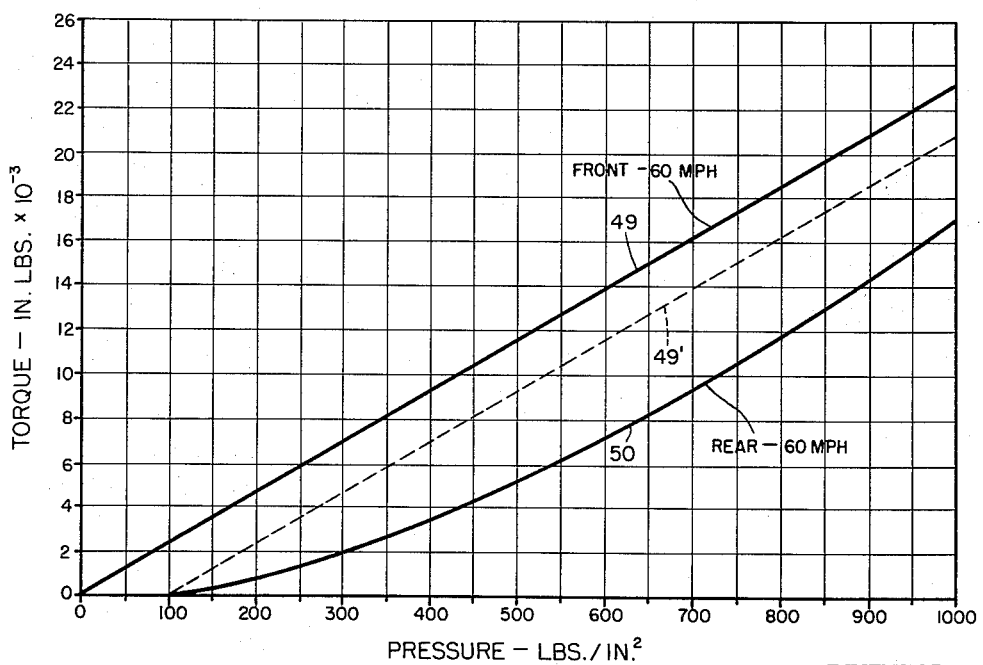
FIG. 7 is a set of torque versus wheel cylinder hydraulic pressure curves for the brakes of the preferred embodiment system of FIG. 1 before any valve device is placed in the system.

When the system of FIG. 1 is employed without compensating valves, the disk-type brakes 15 at the front wheels will become effective immediately with a very small increase in hydraulic pressure at the wheel cylinders, as shown in FIG. 7. However, a small increase in hydraulic pressure will not cause the drum-type brakes to become immediately effective because the return springs as normally employed on drum-type brakes prevent the wheel cylinders of the drum-type brakes from engaging the brake shoes of the drum until a pressure of approximately 110 p.s.i. has been reached. It will be noted that curve 49 for the front wheel disk-type brakes becomes effective at very low wheel cylinder pressures and is virtually linear. Curve 50 for the rear wheel drum-type brakes does not become effective until approximately 110 p.s.i. and is not linear until approximately 550 p.s.i. Hold-off valve 16 effectively moves curve 49 over to a new position 49' by reducing the pressure from the master cylinder to the wheel cylinders of the disk-type brakes approximately 110 p.s.i. over the entire range of the torque curve. The examination of the uncompensated curves of FIG. 7 permits the determination of the preferred setting of hold-off valve 16.

Figure 8:
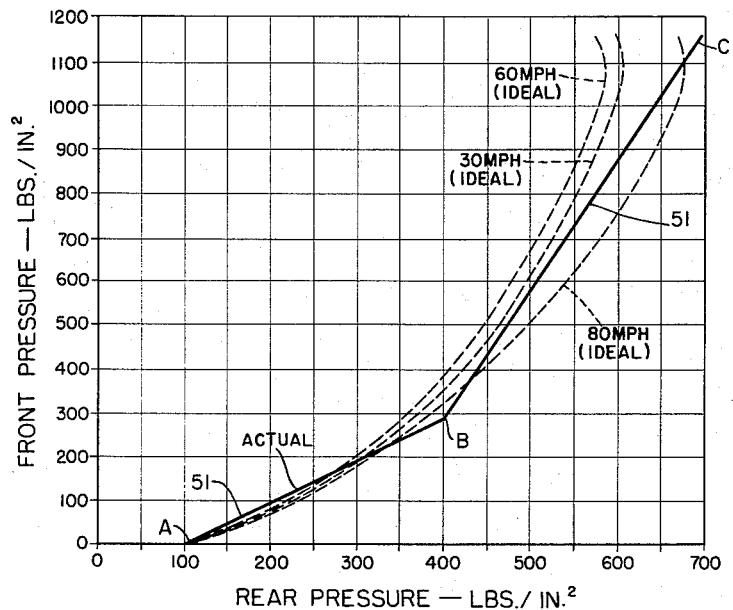
FIG. 8 is a set of curves illustrating ideal hydraullic pressures at the wheel cylinders of the front and rear brakes to obtain ideal torque and braking distribution.

When the normal wheel load distribution at different rates of deceleration is known, the data shown in FIG. 7 may be employed to obtain the most desirable torque or braking effect (proportional to wheel cylinder pressure) at the front and rear wheels. A set of ideal torque (pressure) distribution curves is shown in FIG. 8. These curves include dynamic load distribution effects. For example, at sixty miles per hour, when the front wheel brakes receive 700 p.s.i. the ideal pressure for the rear brakes would be 525 p.s.i. to obtain ideal braking characteristics. FIG. 8 illustrates that the ideal maximum safe pressure to be applied to the wheel cylinders of the rear brakes at sixty miles per hour is of the order of 600 p.s.i. Any further increase at the rear wheel brakes would probably cause rear wheel skidding. The curves further indicate that the maximum potential braking effect permits increasing the pressure at the front wheel brakes to a value in excess of 1000 p.s.i. If the compensating valves of the present invention are not provided in the braking system of FIG. 1, the maximum braking effect obtainable from the front wheel brakes is never achieved without skidding or locking up the rear wheel brakes. Further, at low rates of deceleration (indicative of low wheel cylinder pressures) the front wheel brakes of the uncompensated system would perform the major braking effect. This tends to wear out the front wheel brakes faster and also presents an extremely hazardous condition on slippery roadways. At high rates of deceleration (indicative of rather high wheel cylinder pressures) there is a tendency in the uncompensated system for the rear wheels to skid before the maximum ideal torque has been applied to the front wheels. Not only does this create a substantial loss in braking effectiveness, but, as already explained, such a braking condition is highly undesirable.

Hold-off valve 16 also effectively shifts curve 51 of FIG. 8, similar to the shift of curve 49 of FIG. 7, thus, causing the actual curve 51 to substantially coincide with the ideal curves of FIG. 8, between the points A and B. At point B on curve 51 the proportioning valve 14 becomes effective to reduce the additional pressure being supplied to the rear wheel brakes so that the actual curve 51 between the points B and C again substantially coincides with the ideal curves of FIG. 8.

Figure 9:
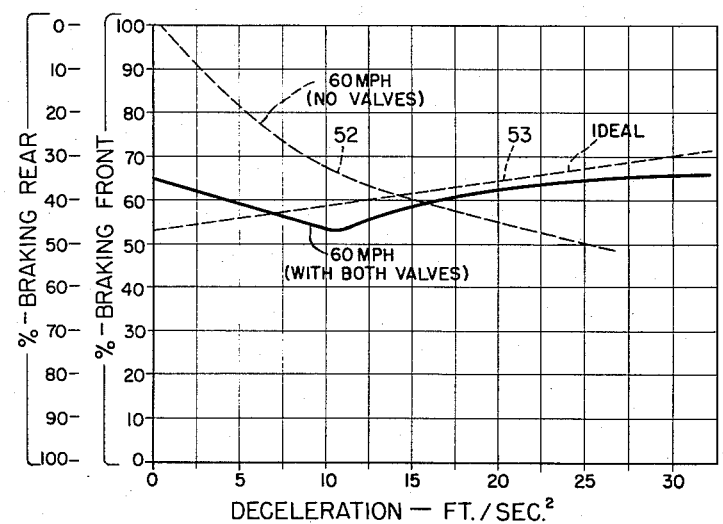
FIG. 9 is a set of curves comparing the braking distribution between front and rear brakes for: an ideal system, a system having no compensation, and the actual compensation provided by the present invention.

A further illustration of the improved braking system obtained by the novel proportioning valve 14 is illustrated in FIG. 9 showing the percentage braking effect of the front and rear brakes versus: an uncompensated system, an ideal theoretical system, and the actual results obtained with the proportioning valve 14 and hold-off valve 16 in the present system. Curve 52 illustrates that a system having no compensation, even though designed for the best possible braking effect, would provide a braking system in which the front wheel brakes perform the greatest amount of work. Curve 52 tends to explain why the prior art braking systems easily skid on slippery surfaces by locking up the front wheel brakes. Further, curve 52 illustrates that at high rates of deceleration the front wheel brakes are only performing approximately one-half the braking torque even though the normal load on the front wheels would permit greater braking torque. Curve 53 illustrates that a theoretical ideal braking system balances the braking effect at low rates of deceleration and produces higher braking effect on the front wheels at high rates of deceleration. Curve 54 illustrates the actual distribution of braking effect accomplished by the novel proportioning valve 14 and the hold-off valve 16. At low rates of deceleration, where skidding is not imminent, the front wheel brakes are adapted to provide a greater amount of braking effect to insure that the front wheel brakes skid prior to the rear wheel brakes on slippery surfaces thus achieving the most desirous condition without incurring a substantial unbalance in wear. Further, curve 54 illustrates that at normal deceleration rates between 7 and 15 feet per second, the braking effect on the front and rear wheels is approximately equally distributed, but the greater amount of braking effect is still performed by the front wheel brakes. Curve 54 also illustrates that at extremely high rates of deceleration the braking effect is so distributed that the actual braking curve is almost coincident with the ideal conditions to obtain maximum braking effect. Without the compensating valves, it would be impossible to achieve maximum stability at higher rates of deceleration nor could there be obtained as high a rate of deceleration.

Having explained the advantages obtained by the novel proportioning valve, it is apparent that the hold-off valve and proportioning valve could be combined in a single structure and maintain the same mode of operation. The values of pressure and deceleration are typical of a single preferred embodiment and are not typical of all systems to which the invention is applicable. Also, changes in the location of the inlets and outlets in the bore of the valve body could be accomplished while adhering to the proportioning piston principle. While a single preferred embodiment and a single modification have been shown by way of illustration, other modifications and arrangements will suggest themselves to those skilled in the art.

What is claimed is:

1. A valve device for proportionately reducing hydraulic fluid pressure being supplied to the rear wheel cylinders of a vehicle comprising:
   a hollow valve body casing having a small inlet bore and a larger outlet bore,
   an inlet passageway connected to said inlet bore and adapted to be connected to the brake actuating cylinder,
   an outlet passageway connected to said outlet bore and adapted to be connected to the rear wheel cylinders,
   a piston body having an inlet end piston and an outlet end piston slidably mounted in said inlet and outlet bores of said valve body casing and forming sealed opposed inlet and outlet fluid chambers therein respectively,
   an aperture through said piston body interconnecting said inlet and said outlet chambers,
   resilient means urging said piston body toward said outlet passageway,
   a valve seat around said aperture at said inlet end of said piston body,
   a valve body movably mounted in said inlet bore of said valve body apart from and opposite said aperture in said piston body, resilient means urging said valve body away from the end of said inlet piston and against a stop adjacent said inlet passageway, means providing a fluid passageway around said valve body when disposed against said stop,
   and a valve face on said valve body opposite said valve seat,
   said piston body being moved toward said valve body due to an increase in hydraulic pressure in the valve body to seal off said aperture causing said piston body and said valve body to cooperate to form a a pressure reducing piston body in said bores of said valve body casing to proportionately reduce a further increase in the hydraulic fluid pressure supplied to the rear wheel cylinders of a vehicle.

2. A valve device for selectively reducing the pressure of hydraulic fluid passed therethrough comprising: a hollow valve body casing having an outlet fluid chamber and an inlet fluid chamber connected respectively to an outlet and an inlet in the valve body casing, said outlet fluid chamber being provided with a greater cross-section area than said inlet fluid chamber, a piston body having an inlet piston end slidably fitted in said inlet fluid chamber and an outlet end piston slidably fitted in said outlet fluid chamber, spring means normally urging said piston body away from said inlet fluid chamber, an aperture through piston body interconnecting said inlet fluid chamber and said outlet fluid chamber, a valve seat on said inlet end of said piston body surrounding said aperture, and a floating valve body mounted in said inlet fluid chamber opposite said valve seat, together with means resiliently urging it away from said valve seat and against a fixed stop means, to permit hydraulic fluid to initially flow through said piston body, said piston body being initially movable toward said valve body to bring its valve seat into engagement with said floating valve body due to an increase in fluid pressure in said outlet chamber, and said floating valve body and said piston body being thereafter movable as a unit toward said outlet in the valve body casing due to a further increase in fluid pressure in said inlet chamber whereby said further increase in fluid pressure in said inlet chamber is accompanied by a further increase in fluid pressure in said outlet chamber proportionate to the ratio of the areas of the pistons in the inlet and outlet fluid chambers.

3. A valve device as set forth in claim 2 wherein said spring means is of a type which interposes resilient action up to a predetermined point and there collapses after said floating valve body is sealed on said valve seat.

4. A valve device comprising:
(a) a valve body casing having,
  an inlet,
  an outlet,
  an inlet fluid chamber, and
  an outlet fluid chamber of larger cross-section area than said inlet chamber,
(b) a compound piston body having,
  an inlet end piston slidably mounted in said inlet chamber, and
  an outlet end piston slidably mounted in said outlet chamber,
(c) seal means cooperating with said pistons and said bores
(d) spring means intermediate said pistons mounted between said valve body casing and the outlet piston biasing said compound piston body to said outlet chamber,
(e) a vent in said valve body casing connecting the space for said spring means to the atmosphere,
(f) an aperture through said compound piston body,
(g) a valve seat in said aperture facing the inlet chamber,
(h) a floating valve in said aperture, and
(i) a spring intermediate said valve and said seat biasing said valve in the open position and against rear stop means in said inlet chamber, there being fluid passage space past said valve when in its rear position,
(j) said compound piston body being moved toward said inlet end by an increase in fluid pressure in said inlet and said outlet chambers causing said valve to close by movement of the piston body toward said inlet chamber, and said compound piston body and said valve being moved, after valve closure, as a unit toward said outlet chamber by a subsequent increase in fluid pressure in said inlet chamber, causing a proportional pressure reduction in said outlet chamber.

References Cited by the Examiner
UNITED STATES PATENTS

| | | | |
|---|---|---|---|
| 1,890,088 | 12/1932 | Kasantzeff | 303—60 |
| 2,821,104 | 10/1955 | McClure | 303—60 |
| 2,848,875 | 8/1958 | Baldwin | 60—54.5 |
| 3,068,050 | 12/1962 | Pekrul | 303—60 X |
| 3,088,285 | 5/1963 | Giacosa et al. | 60—54.6 |
| 3,147,042 | 9/1964 | Stelzer | 303—6 |
| 3,153,560 | 10/1964 | Henry-Biabaud | 303—22 |

EUGENE G. BOTZ, *Primary Examiner.*

M. S. SALES, *Assistant Examiner.*